2,797,232

HIDDEN POLYISOCYANATES

Wilhelm Bünge, Leverkusen, Germany, assignor to Farbenfabriken Bayer Aktiengesellschaft, Leverkusen, Germany, a corporation of Germany No Drawing. Application March 31, 1954,
Serial No. 420,204

Claims priority, application Germany April 2, 1953

7 Claims. (Cl. 260—471)

This invention relates to hidden polyisocyanates and is more particularly concerned with new compounds which under suitable conditions react as polyisocyanates.

In the present specification the term "polyisocyanates" is used to include di-, tri- and polyisocyanates. Similarly, the term "polycarboxylic acids" is used to designate di-, tri- and polycarboxylic acids.

It is well known that the isocyanato groups of polyisocyanates may be blocked by reaction with monofunctional compounds that may easily be split off to give the original polyisocyanate. Thus, so-called "hidden polyisocyanates" which are useful in the preparation of stable mixtures from polyisocyanates and polyhydroxy compounds may be obtained. At elevated temperatures the hidden polyisocyanates react with the polyhydroxy compounds present in the mixture while splitting off the monofunctional compound which had been used to block the isocyanato groups.

Monofunctional compounds which may be reacted with polyisocyanates to form hidden polyisocyanates include phenol, cresol, acetoacetic ester. The arylurethanes formed by the reaction of polyisocyanates with phenols have become particularly important for the manufacture of varnishes and plastics.

It is an object of the present invention to provide new hidden polyisocyanates. Another object is to provide hidden polyisocyanates which are easily obtainable. Further objects will appear hereinafter.

These objects are attained in accordance with the present invention by reacting at temperatures below 150° C. hydroxyalkyl-carbamic acid-aryl esters with polyisocyanates, polycarboxylic acids or functional derivatives of the latter.

In the case of a diisocyanate and hydroxyethylcarbamic acid-phenyl ester, the reaction underlying the process of the invention may be represented by the following general equation:

O=C=N—R—N=C=O+2C₆H₅—O—CO—NH—
(CH₂)₂OH→C₆H₅—O—CO—NH—(CH₂)₂—O—CO—
NH—R—NH—CO—O—(CH₂)₂NH—CO—O—C₆H₅ in which R is a divalent radical.

In the case of a dicarboxylic acid and hydroxyethylcarbamic acid phenyl ester, the reaction underlying the process of the invention may be represented by the following general equation:

HOOC—R—COOH+2C₆H₅—O—CO—NH—(CH₂)₂—
OH→C₆H₅—O—CO—NH—(CH₂)₂—O—CO—R—
CO—O—(CH₂)₂—NH—CO—O—C₆H₅+2H₂O in which R has the same meaning as above.

It may be seen from the above equations that the hidden polyisocyanates obtained in accordance with the invention contain urethane- and ester groups, respectively. At temperatures above 150° C. the new hidden polyisocyanates give free polyisocyanates in accordance with the following equations:

(1) C₆H₅—O—CO—NH—(CH₂)₂—O—CO—NH—
R—NH—CO—O—(CH₂)₂—NH—CO—O—C₆H₅→
2C₆H₅OH+O=C=N—(CH₂)₂—O—CO—NH—
R—NH—CO—O—(CH₂)₂—N=C=O (2) C₆H₅—O—CO—NH—(CH₂)₂—O—
CO—R—CO—O—(CH₂)₂—NH—CO—O—C₆H₅→
2C₆H₅OH+O=C=N—(CH₂)₂—O—CO—R—CO—
O—(CH₂)₂—N=C=O

The hydroxyalkyl-carbamic acid-aryl esters which are employed in the process of the invention may be obtained by reacting arylchlorocarbonates with hydroxyalkylamines, such as ethanolamine.

Among the polyisocyanates which may be reacted with hydroxyalkyl-carbamic acid-aryl esters according to the invention are: aliphatic, aromatic, and hydroaromatic di- and triisocyanates such as tetramethylene-diisocyanate, hexamethylene-diisocyanate, p-phenylene-diisocyanate, toluylene-diisocyanate, 4,4'-dicyclohexylmethane-diisocyanate, 1-methylbenzene-2,4,6-triisocyanate and polyisocyanates obtained by reaction of diisocyanates with polyhydric alcohols in accordance with the process described in German Patent 870,400.

Examples of polycarboxylic acids which may be used for the process of the invention include: oxalic acid, succinic acid, adipic acid, methyladipic acid, sebacic acid, thiodiglycolic acid, maleic acid anhydride, phthalic acid, terephthalic acid, and citric acid. In place of the free polycarboxylic acids, functional derivatives thereof, such as their esters and halides, may be employed, the halides being particularly suitable.

In preparing the new hidden polyisocyanates equivalent amounts of the reactants are mixed, preferably in an inert solvent.

The invention makes it possible to produce hidden polyisocyanates, which have proven very useful for many applications, in a very simple manner.

The invention is further illustrated by the following examples without being restricted thereto, all parts being by weight:

*Example 1*

87 parts of toluylene-diisocyanate are added at 70 to 80° C. to a solution of 181 parts of hydroxyethyl-carbamic acid-phenyl ester in 90 parts of benzene while stirring. The reaction is completed by refluxing the mixture for 2 hours. Most of the reaction product crystallizes from the benzene solution thus obtained.

When a solution of the reaction product in methyl-glycol acetate is mixed with the theoretical amount (based on the hidden isocyanato groups) of a polyester containing free hydroxy groups and obtained from a dicarboxylic acid and a polyhydric alcohol a varnish solution which is stable at room temperature results.

From this solution a lacquer which is insoluble and resistant to chemicals may be obtained at baking temperatures above 150° C. The film formation may be accelerated by the addition of a small amount of a tertiary amine.

*Example 2*

181 parts of hydroxyethyl-carbamic acid-phenyl ester are refluxed in 150 parts of ethyl acetate. To the boiling solution there are added while stirring 101 parts of phthalyl chloride. A reaction in which hydrogen chloride is evolved takes place. On distilling off the ethyl acetate a soft resin is obtained. At elevated temperatures the resin behaves like a diisocyanate after splitting off phenol.

*Example 3*

Following the procedure of Example 2, but using 77 parts of succinic chloride instead of 101 parts of phthalyl chloride a viscous oil is obtained. The oil is mixable with ethyl acetate and methylgylcol acetate in all proportions and gives elastic baking lacquers when combined with polyesters containing free hydroxy groups.

Example 4

360 parts of toluylene-2,4,6-triisocyanate are mixed with a 50 percent ethyl acetate solution from 905 parts of hydroxyethyl-carbamic acid-phenyl ester. The mixture is heated to 70 to 80° C. On refluxing for 2 hours the solvent is removed by distillation in vacuo. Thus, a hard resin which is soluble in ethyl acetate, acetone, and methylgylcol acetate is obtained.

Example 5

420 parts of 1,6-hexane-diisocyanate are mixed with a 50 percent ethyl acetate solution of 905 parts of hydroxyethyl-carbamic acid-phenyl ester. On refluxing for 6 hours ethyl acetate is distilled off. The residue constitutes a soft resin which is soluble in ethyl acetate, acetone, and methylgylcol acetate and apt to crystallize.

Example 6

A solution of 132 parts of trimethylol-propane in 77 parts of ethyl acetate is added at 70° C. over a period of 2 hours to a solution of 400 parts of toluylene-diisocyanate in 100 parts of ethyl acetate. The homogeneous solution thus obtained is heated for 3 hours at 70 to 75° C. The polyisocyanate which is present in the solution contains 12.3% NCO.

Then 304 parts of hydroxyethyl-carbamic acid-cresyl ester and 108 parts of ethyl acetate are added to the solution of the polyisocyanate. On heating for 12 hours at 75° C. a clear 60% solution of the corresponding hidden polyisocyanate is obtained.

I claim:

1. Process for the conversion of polyisocyanates and dicarboxylic acids into urethanes capable of being thermally decomposed into polyisocyanates having a higher molecular weight than the starting material, which comprises contacting a hydroxy-alkyl-carbamic acid-aryl ester with a member selected from the group consisting of organic diisocyanates, organic triisocyanates, dicarboxylic acids, and functional derivatives of dicarboxylic acids at a temperature below about 150° C., and recovering the urethane formed, which is capable of yielding at increased temperatures a free polyisocyanate having a higher molecular weight than said group member.

2. Process according to claim 1, in which said hydroxyalkyl-carbamic acid-aryl ester is a hydroxyethyl-carbamic acid-phenyl ester.

3. Process according to claim 1, in which said group member is a diisocyanate.

4. Process according to claim 1, in which said group member is a triisocyanate.

5. Process according to claim 1, in which said group member is a dicarboxylic acid chloride.

6. Process according to claim 1, in which said contacting is effected with equivalent amounts of said hydroxy-alkyl-carbamic acid-aryl ester and said group member is an inert solvent.

7. Process according to claim 6, in which said contacting is effected with heating to a temperature below about 150° C.

References Cited in the file of this patent
FOREIGN PATENTS

| | | |
|---|---|---|
| 620,116 | Great Britain | Mar. 21, 1949 |
| 506,813 | Belgium | Nov. 14, 1951 |